Patented Apr. 24, 1951

2,550,134

UNITED STATES PATENT OFFICE 2,550,134

FLAME RESISTANT FABRIC

Ladislaus Balassa, Riverside, and Neil Crawford Spencer, Newport, R. I., assignors to The United States Finishing Company, Norwich, Conn., a corporation of Connecticut No Drawing. Original application May 10, 1947, Serial No. 747,312. Divided and this application March 5, 1948, Serial No. 13,345

3 Claims. (Cl. 117—136)

This invention relates to an improved flame-resistant fabric comprising a textile material impregnated with a fire-retardant resinous composition formed by the reaction of boric acid and a polyhydroxy alcohol, and more particularly to such material impregnated with the bori-borate resin of a polyhydroxy alcohol, boric acid and borax.

It is known that borax and boric acid in a variety of combinations have potentially valuable flame-retardant properties, but the resinous compositions made with these substances have not proven entirely satisfactory for use in impregnating, principally because they are either too expensive or too unstable. The known bori-borate resins which are formed of borax, boric acid and a polyhydroxy alcohol necessarily employ a very large amount of the alcohol. The alcohol is expensive, and when used in large amounts introduces an unduly large proportion of inflammable material into a composition otherwise fire-retardant. However, any attempt to reduce the proportion of the alcohol substantially is met with the difficulty that the solution becomes unstable. The instability of a typical known composition was evidenced by the precipitation of solid crystalline material from solutions with a range between 20 and 80 percent solids content. A composition is not sufficiently stable for impregnating textiles if it forms a crystalline or insoluble precipitate in this range in less than one month.

We are now able to prepare highly fire-resistant yet stable bori-borate compositions by condensing boric acid, borax and a polyhydroxy alcohol in the approximate ratios of 70 : 80 : 83.5 provided that at the end of the condensation process 6 to 8 percent by weight of the total composition of a suitable amino compound are added. Such compositions contain before condensation an over-all ratio of borax-boric acid of between 60–65 percent to a total of 35–40 percent of organic material. This composition is much less expensive because such small amounts of the alcohol can be used, and yet it retains its stability even after long storage. It is an excellent fire-retardant for impregnating textiles, and is also suitable for use as a sizing agent, a lubricant or an adhesive. A typical composition was prepared as set out in Example I.

Example I

The bori-borate resin was prepared with the following ingredients:

| | Grams |
|---|---|
| Boric acid powder | 980 |
| Ethylene glycol (99.5%) | 1171 |
| Sodium tetra-borate decahydrate | 1120 |
| Distilled water | 1400 |
| Triethanolamine (technical, 80%) | 334.3 |
| Total | 5005.3 |

From the above it will be seen that the ethylene glycol (alcohol) and the sodium tetra-borate decahydrate (borax) are in the proportions of 1171 to 1120 and therefore are substantially equal.

The boric acid and ethylene glycol were placed in a stainless steel vessel of one gallon capacity equipped with a variable speed stainless steel stirrer. The vessel was jacketed and heated indirectly with oil as the heat transfer medium. Under continuous agitation the mixture was heated to 120° C. over a period of 1¼ hours. When the reaction mixture reached this temperature, the heating was discontinued. The sodium tetra-borate was slurried with 840 grams of water and introduced into the vessel without stopping the agitator. Heating was then resumed and continued for a period of about 2¾ hours in such a manner as to maintain a temperature differential of about 30° C. between the oil in the jacket and the reaction mixture. On reaching 156° C., heating was discontinued, but the temperature continued to rise and reached 160° C. It was found undesirable to exceed this temperature because the resinous mass in the vessel tended to solidify above 160° C. and make subsequent removal of the reaction mass exceedingly difficult. The content of the vessel was allowed to cool to 140° C. under constant stirring, and the triethanolamine was added at this point. The introduction of triethanolamine lowered the temperature to 135° C. which was followed by a rapid rise to approximately 142° C. The agitation of the mixture was continued which brought about a gradual lowering of the temperature. When the mixture reached 130° C. and was still in a highly viscous, molten state, the remainder of the water was added very slowly. The agitation of the mass was continued until the temperature of the mixture dropped to about 100° C. At this point agitation was discontinued, and the product was removed from the vessel. The yield was 2900 grams of resin solution; the solids content was 79 percent.

The amino compound should have a minimum boiling point of 160° C., a vapor pressure maximum of 0.5 mm. Hg. at 20° C., a pH minimum of 9 in 25% solution of 20° C., and should, with a maximum of 10% calculated on the dry resin, be compatible with and should not salt out of resin solutions of 20% to 80% total solids content.

Triethanolamine was the most satisfactory of the amino compounds used. The hydroxy ethyl, hydroxy propyl and hydroxy isopropyl amines are preferred stabilizers. Tetraethanol ammonium hydroxide and amino-ethylethanolamine are operative. Monoethanolamine and diethanolamine may be used, but only with some sacrifice of flame resistance, and so are not preferred. Propanol and isopropanol amines should behave similarly, i. e. with some sacrifice of flame-resistance. It should be noted that the small amount of amino compound used is substituted for the large amount of alcohol that would otherwise be used to obtain stability, and does not give the same result as adding more borax, which would destroy the stability of the composition. Nor should the amount of triethanolamine used be allowed to reduce the amount of borax, as to do so would decrease the fire retardance.

As another example of a suitable polyhydroxy alcohol, glycerol was used in producing a resinous composition similar to that of Example I. However, it is somewhat inferior to the glycol composition, which is outstanding. The stability of the resins produced decreases with increasing chain length of the polyhydroxy alcohols.

Example II

The glycerol solution had the following ingredients:

|  | Grams |
|---|---|
| Boric acid powder | 980 |
| Glycerol, 95% pure | 1155 |
| Distilled water | 1400 |
| Sodium tetraborate powder ($Na_2B_4O_7.10H_2O$) | 1120 |
| Triethanolamine, 80% pure | 334 |
| Total | 4989 |

From the above it will be seen that the ethylene glycol (alcohol) and the sodium tetra-borate decahydrate (borax) are in the proportions of 1155 to 1120 and therefore are substantially equal.

The boric acid and glycerol were placed in a stainless steel vessel of one gallon capacity equipped with a variable speed stainless steel stirrer. Under continuous agitation the vessel was heated in an oil bath to 120° C. for a period of 2½ hours. During this time approximately 590 grams of water were evaporated, condensed and collected. When the temperature of the reaction mixture reached 120° C., heating was discontinued. The sodium tetraborate was made into a slurry with 840 grams of water and charged into the vessel without stopping the agitator. Heating was resumed and continued for an additional period of two hours or until the temperature of the reaction mass had reached 140° C. A temperature differential of about 30° C. was maintained between the oil bath and the reaction mixture. When the heating was discontinued, the heat of the oil bath carried the temperature of the vessel to 144° C. It was found undesirable to exceed this temperature as the resin in the vessel above 144° C. tended to set up into a solid mass which made subsequent removal exceedingly difficult. When the temperature reached 144° C., the triethanolamine was rapidly added under continuous agitation. The temperature fell to 140° C. and then rose rapidly to 146° C. at which point it remained for several minutes before it began a steady decline. When the temperature dropped to 140° C., the remainder of the water, 560 grams, was added and the cooling continued. When the temperature dropped to 100° C. the product was removed from the reaction vessel. The yield was 2841 grams of resin solution having a total solids of 89.2 percent.

Strips of fabric were "padded" with a 20% solids solution of the bori-borate resins obtained as shown above. By "padding" we mean an impregnation process in which the fabric is dipped into a shallow pan containing a liquid and then passed between a pair of squeeze rolls consisting of one stainless steel and one synthetic rubber roll. The squeeze pressure on the rolls is adjusted to result in approximately 80 percent wet pick-up (liquid retention) calculated on the weight of the dried fabric. The padding in the experimental work was carried out in a laboratory padding machine having a micro-set housing, a top roll with a 3¼" diameter and a bottom roll with a 3" diameter. The fabric was usually passed twice through the rolls of the padder, being turned over between passes so that both sides of the fabric were contacted by the steel roll. Typical data for one operation of this type are as follows: weight of the fabric before padding 80.0 grams; weight of the fabric after padding 144.2 grams; weight of the 20 percent resin solution picked up 64.2 grams; wet pick-up 80.3%; dry add-on (resin solids), calculated, 16.1%.

Fabrics with satisfactory fire resistance were obtained with the compositions described herein if the paddings were carried out in such a manner so as to obtain a minimum of 15% dry add-on on the basis of the dry fabric. Certain fabrics may require a higher dry add-on than others, but 20 percent was found sufficient in all cases when tested on cotton twill, cotton broadcloth, and spun rayon fabrics. It should be recognized, however, that some fabrics do not, for their intended use, require substantially complete flame resistance, in which event a 10% to 15% dry add-on may be used. If substantially over 20% dry add-on is employed, the fabric at times of high atmospheric humidity will feel moist. This may not be undesirable for some initially highly inflammable materials when the "feel" of the finished product is not important, in which case as much as 35% might conveniently be used. The usual and preferred range is, however, 15% to 20%.

With a 16% dry add-on, and before dry cleaning, cotton twill showed an after-glow of 15 seconds and spun rayon an after-glow of 21.8 seconds. By "after-glow" we mean the smoldering often referred to as flameless combustion, noticed on the charred portions of the fabric at the end of fire retardance tests. The tests for fire retardance were carried out in accordance with the recommendations of the Report of Committee on the Testing of Fire Retardant Textiles by James R. Redmond, A. A. T. C. C. 1945 Year Book; volume 22, pages 134–137.

After dry cleaning, however, the cotton twill had an after-glow of 3 minutes, 15 seconds and the spun rayon an after-glow of 3 minutes, 28 seconds. This time was markedly reduced by the addition of a guanidine phosphinate or phosphonate. The procedure with the phosphinate was typical, and is given below.

Example III

The ingredients of the guanidine phenyl phosphinate solution used were as follows:

|  | Grams |
|---|---|
| Phenylphosphinic acid | 7.15 |
| Distilled water | 32.44 |
| Guanidine carbonate | 12.22 |
| Total | 51.81 |

The phenylphosphinic acid was dissolved in the water. The guanidine carbonate was added slowly to the phenylphosphinic acid solution while stirring vigorously. After the evolution of carbon dioxide had stopped, the mixture was heated until a clear solution was obtained.

This solution was mixed with the resin solution of Example I, with 22.9 grams of the phosphinate solution to 188.8 grams of the resin solution (80.3% total solids). Cotton twill padded with the phosphinate resin solution (diluted with water to 20% solids content) showed an after-glow of 15 seconds before dry cleaning and 23 seconds after dry cleaning. The spun rayon had an initially greater fire retardance before dry cleaning, as the after-glow was 4 seconds as compared with 21.8 seconds for the solution of Example I. After dry cleaning, the after-glow was only 39 seconds as compared with 3 minutes and 28 seconds for the solution of Example I. Thus the phosphinate solution was effective in preserving to a large extent the fire retardance of two of the fabrics which were subjected to dry cleaning, and in increasing the initial fire-retardance of the rayon before dry cleaning.

The abrasion resistance of the fabrics impregnated with the bori-borate resins above described was increased over that of the untreated fabrics. Tests were carried out in a Taber Abraser, Model E-4010, using the method proposed by Kaswell (Ernest R. Kaswell, Textile Research Journal 16, 502–521 (1946)). The fabric specimens were abraded to the number of cycles found sufficient to result in a reduction of approximately 50 per cent of the tensile strength of the untreated controls. The relative difference noted was accepted to be caused by the resin contained in the fabric. The tensile strength tests were carried out in a Suter motor driven tensile strength tester with 4 oz. cotton, broadcloth.

*Comparison table*

|  | Tensile strength, pounds |
|---|---|
| Unabraded control | 82.2 |
| Control | 38.5 |
| Example I with 16.5% dry add-on | 53.5 |

The fabrics impregnated with the resin solutions herein described did not suffer any noticeable loss of tensile strength provided the impregnated fabrics were allowed to acquire equilibrium with the moisture content of the air before subjecting them to tensile strength tests.

It will be understood that the proportions of the various ingredients in the compositions above described can be varied somewhat. For example, the proportion of the polyhydroxy alcohol could be increased and the proportion of triethanolamine could be decreased. But to do so would be without advantage, as it is the purpose of the invention to use as little of the alcohol as possible and to use just enough of the amino compound, with whatever amount of alcohol is used, to obtain a sufficiently stable composition. As for the composition containing an organic phosphinate or phosphonate, those skilled in the art will appreciate that the example given illustrates a suitable degree of preservation of fire-retardance after dry cleaning, and be governed accordingly.

This is a divisional application of application Serial Number 747,312, filed May 10, 1947.

We claim:

1. A fire-resistant textile fabric impregnated with a fire-resistant composition consisting essentially of borax, boric acid, a polyhydroxy alcohol capable of reacting with the borax and boric acid to form a condensation product, said materials being in the aproximate ratios 70:80:83.5 parts by weight and an alkane having at least two and not more than three carbon atoms in the chain in which one of the hydrogen atoms is substituted by an amino group and a second hydrogen atom is substituted by a hydroxyl group, said alkane being in the proportion of 6 to 8% by weight of the total composition.

2. A fire-resistant fabric comprising an initially combustible textile material impregnated with a composition consisting essentially of borax, boric acid, a polyhydroxy alcohol capable of reacting with the borax and boric acid to form a condensation product, said materials being in the approximate ratios 70:80:83.5 parts by weight and a short chain alkylol amine in the proportion of 6 to 8% by weight of the total composition.

3. The fabric defined in claim 1 in which the composition contains substantially equal amounts of borax and alcohol.

LADISLAUS BALASSA.
NEIL CRAWFORD SPENCER.

REFERENCES CITED

The following references are of record in the file of this patent:

UNITED STATES PATENTS

| Number | Name | Date |
|---|---|---|
| 1,953,741 | Bennett | Apr. 3, 1934 |
| 2,032,605 | Whitehead | Mar. 3, 1936 |
| 2,050,196 | Sebrell | Aug. 4, 1936 |
| 2,052,192 | Piggott | Aug. 25, 1936 |
| 2,071,353 | Morgan | Feb. 23, 1937 |
| 2,286,308 | Rosser | June 16, 1942 |
| 2,305,035 | Rosser | Dec. 15, 1942 |

FOREIGN PATENTS

| Number | Country | Date |
|---|---|---|
| 690,746 | Germany | May 6, 1940 |

OTHER REFERENCES

Chemicals by Glyco, a publication of Glyco Products Co., Inc., Brooklyn, N. Y., page 60.